United States Patent

[11] 3,622,181

[72] Inventor Robert D. Smith
 2401 N. 68 St., Scottsdale, Ariz. 85257
[21] Appl. No. 52,540
[22] Filed July 6, 1970
[45] Patented Nov. 23, 1971

[54] UNIVERSAL BOAT LAUNCHER
 6 Claims, 5 Drawing Figs.
[52] U.S. Cl................................................. 280/476,
 214/500, 280/414
[51] Int. Cl............................................... B62d 53/00
[50] Field of Search.......................... 214/500;
 280/3, 414, 476, 461

[56] References Cited
 UNITED STATES PATENTS
 2,844,389 7/1958 Burnett ..................... 280/476

3,189,365 6/1965 Blacher ..................... 280/476 X
Primary Examiner—Albert J. Makay
Attorney—A. John Michel ABSTRACT: A vehicular device for the safe, efficient and convenient launching of small pleasure boats and the like from soft ground or from dirt ramps. The vehicle comprises a substantially rectangular steel frame, wheels attached thereto, a centrally located steel ball for receiving the boat trailer tongue, guide means for said tongue, and handle means one end of which is adapted to fit into a specially shaped recess in said vehicle, and the other end of which is adapted to provide the manual force and guidance for controlling the launching of the boat.

PATENTED NOV 23 1971

3,622,181

INVENTOR.
ROBERT D. SMITH
BY
A. J. Michel
ATTORNEY

UNIVERSAL BOAT LAUNCHER

This invention relates to new and useful vehicular devices and structures, and more particularly to such devices which are adaptable to a variety of purposes including the launching of pleasure boats and the like.

It has been found that the launching of pleasure boats from conventional boat trailers on soft ground or from dirt ramps or the like suffers from many drawbacks which the conventional devices are unable to overcome, and accidents, sometimes of a fatal nature, are too frequent occurrences.

It is therefore an object of this invention to provide a boat launcher for pleasure boats and the like which will improve the safety and otherwise facilitate the launching operation of pleasure boats in the absence of a ramp and on any kind of soil condition.

Figure 2:
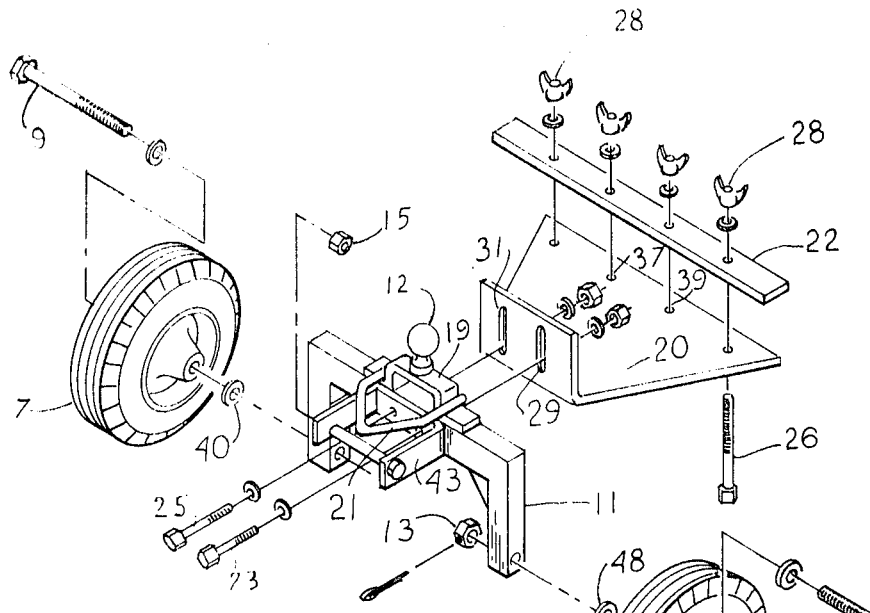
Figure 1:
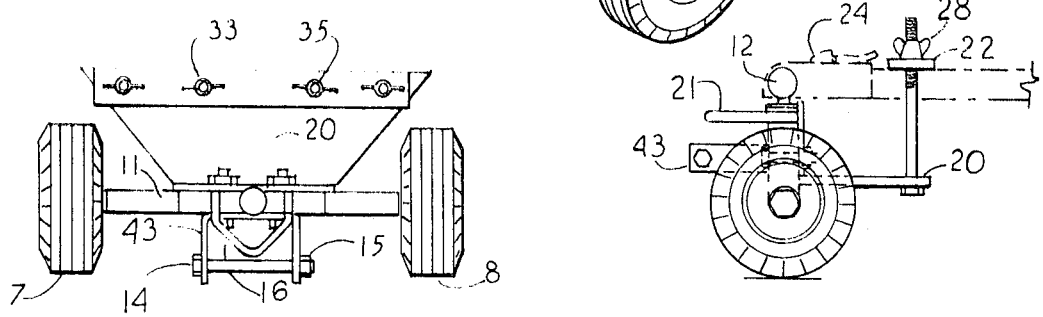
Figure 3:
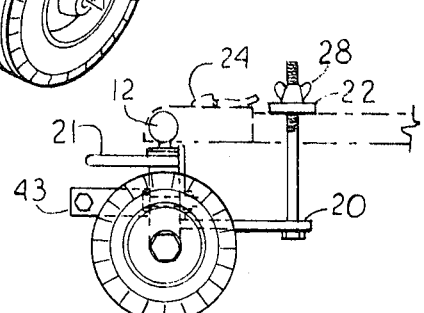
Figure 4:
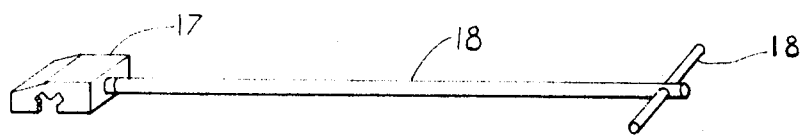
Figure 5:
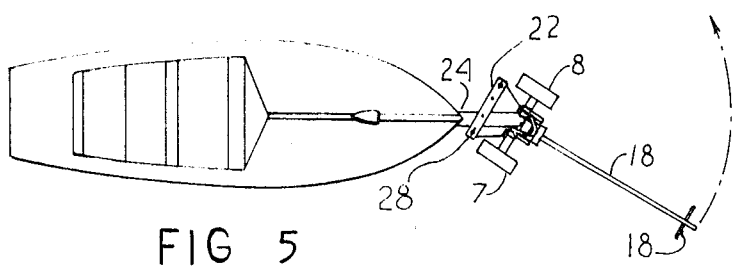

Other objects, advantages and uses of this invention will appear from the following description of one particular embodiment thereof in conjunction with the accompanying drawings in which:

FIG. 1 shows a top plan view of the invention;
FIG. 2 shows an exploded view of FIG. 1;
FIG. 3 shows a side view of FIG. 1;
FIG. 4 shows a handle adapted to cooperate with and facilitate the launching operation, and
FIG. 5 depicts how the invention may be used as a boat launcher.

Referring now more particularly to the drawings, there is shown in FIGS. 1 and 2 a two-wheeled vehicle having rubber tires 7 and 8, axles 9 and 10, a generally rectangular metal frame 11, said frame being supported upon the axles 9 and 10 and secured thereupon by nuts 13 which are cotter-keyed as shown to the axles 9 and 10. Shims 48 and 40 are provided between the frame 11 and the wheels 7 and 8.

As shown, the upper part of frame 11 is integral with a metal ball or coupling device 12 which is securely united with the upper surface of the frame 11 by means of metal member or yoke 19 which may be welded to the flat top surface of the frame 11, and which forms the base for the ball or coupling device 12. Also welded to both sides of the yoke member 19 and extending forwardly therefrom is a substantially U-shaped steel bar 21 which serves as a pull bar for the vehicle.

Securely connected with the front of frame 11 directly beneath pull bar 21 is a substantially rectangular two-pronged steel member 43 whose outer or forward ends are provided with holes which serve as the mounting for a bolt 14 having a nut 15. The rectangular inner portion 16 formed by the prongs 43 and bolt 14 is adapted to receive end 17 of a handle and guide member 18 (FIG. 4) whose function will be described below.

Bolt members 23 and 25 which extend transversely through the frame 11 in a substantially horizontal direction serve two purposes in that they are adapted to securely attach to said frame both the steel guide plate 20 on one side of the frame, and the above-described two-pronged member 43 on the other side of the frame 11. Guide plate 20 is adjustable upwardly and downwardly within vertical slots 29 and 31; to do this, it is only necessary to loosen the two nuts which are secured to bolts 23 and 25, and slide the guide plate 20 up or down. These slots and bolts also make the guide plate 20 completely reversible to accommodate different types of trailers.

As shown in FIGS. 1 and 2, the guide plate member 20 may be coupled, by means of bolts 26 and wingnuts 28, to a second but smaller upper steel plate 22 whereby the plate 22 functions as the upper guide plate for the working end of the trailer tongue 24. Apertures 33 and 35 which are adapted to be engaged by bolts 37 and 39 are provided for the purpose of further guidance of the trailer tongue 24 whenever a more limited lateral guidance is required.

The operation of the embodiment of the invention described above, when used as a boat launcher, is as follows: It is assumed that the pleasure boat has been transported by means of any conventional boat trailer, to the launching area which may be the shoreline or bank of a lake or river or the like. When the boat is in proximity of the water's edge, the tongue end of the boat-supporting trailer is lifted from its car coupling, and is placed upon the coupling knob or ball 12 of the boat launcher. Then, as shown schematically in FIG. 5, the upper guide plate 22 is placed over the tongue arm 24 and secured to the lower guide plate 20 by bolts 26 and wingnuts 28. Next, the end 17 of the handle 18 is inserted into the recess provided by prongs 43 and bolt member 14 in such a manner that the handle functions as a means to steer the launching vehicle and to exert the force necessary to manipulate and steer the loaded vehicle, usually stern first, toward and into the water's edge. After the boat is thus launched and waterborne, the boat is disconnected from the trailer in the usual manner, a rope is connected to the pull bar 21, and the vehicle and the trailer are pulled from the water.

It will be understood by those skilled in the art that the embodiment of the invention described above is capable of variations and modifications within the scope of the present disclosure. It will also be understood that the device described may be used for purposes in addition to the launching of boats, such purposes including, for example, the use as a compact vehicle for moving portable cement mixers, tar wagons, or as a trailertongue stand, or other uses and applications as will readily suggest themselves.

Having now particularly described and ascertained the nature of my invention, I claim:

1. A vehicle adapted as a pleasure boat launcher or the like, comprising a substantially rectangular steel frame, wheel axles suitably positioned on the opposing lateral ends of said frame, rubber-tired wheels mounted upon said axle, means for removably supporting the tongue end of a boat trailer, said supporting means being centrally mounted upon the upper surface of said steel frame, means for guiding the pivotal movement of the trailer tongue in a substantially horizontal plane around said supporting means, said means including two steel plates each adjacent to the top and bottom surfaces of said trailer tongue, respectively, said plates being provided with means for the speedy mounting and dismounting thereof, means integral with the forward end of said frame for the coupling of vehicle-handling means, said means including two lateral steel prongs extending forwardly from said frame, and bolt means adapted to fit a corresponding notch or recess in said handling means.

2. A vehicle as claimed in claim 1, in which said bottom steel plate is adapted to be adjusted vertically, and securely locked in such adjusted position.

3. A vehicle as claimed in claim 1, in which said plate is reversible with respect to its upper and lower surfaces.

4. A vehicle as claimed in claim 1, comprising a handle one end of which is adapted to fit into the space provided by said lateral steel prongs, whereby the handling of said vehicle and the launching of the boat are facilitated.

5. A vehicle as claimed in claim 1, comprising means for attaching a rope or cable to said vehicle whereby said vehicle, supporting a boat or the like, may be readily hauled from the water or shore.

6. A vehicle as claimed in claim 2, in which said plate is reversible with respect to its upper and lower surfaces.

* * * * *